June 1, 1965 G. H. BINGHAM, JR 3,187,073
METHOD OF MAKING A SPIKED, WATERPROOF SHOE
Filed April 26, 1962 2 Sheets-Sheet 1
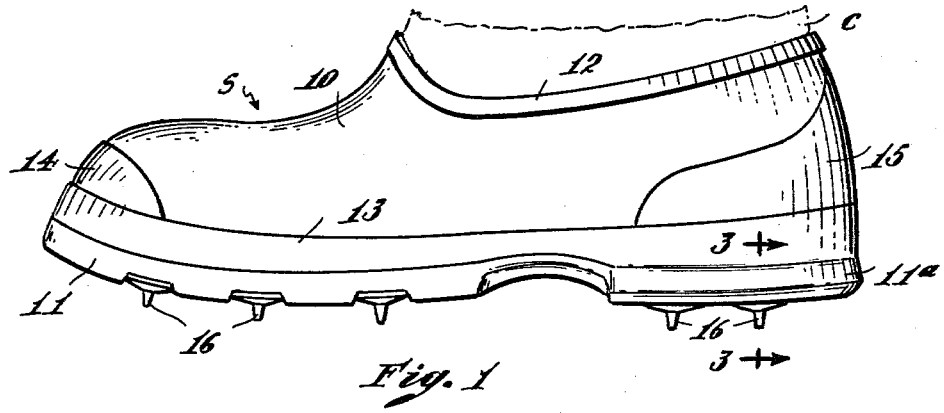
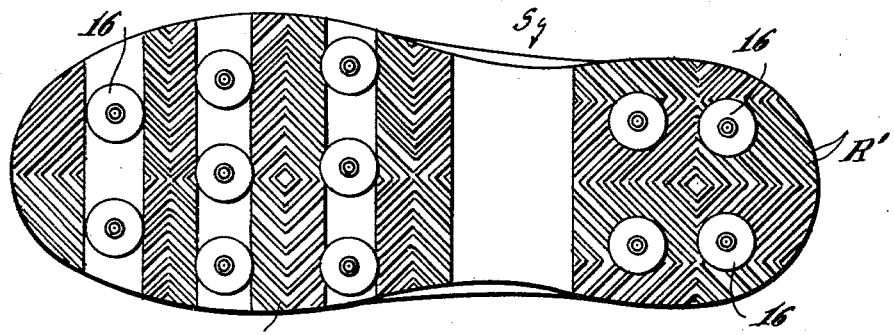
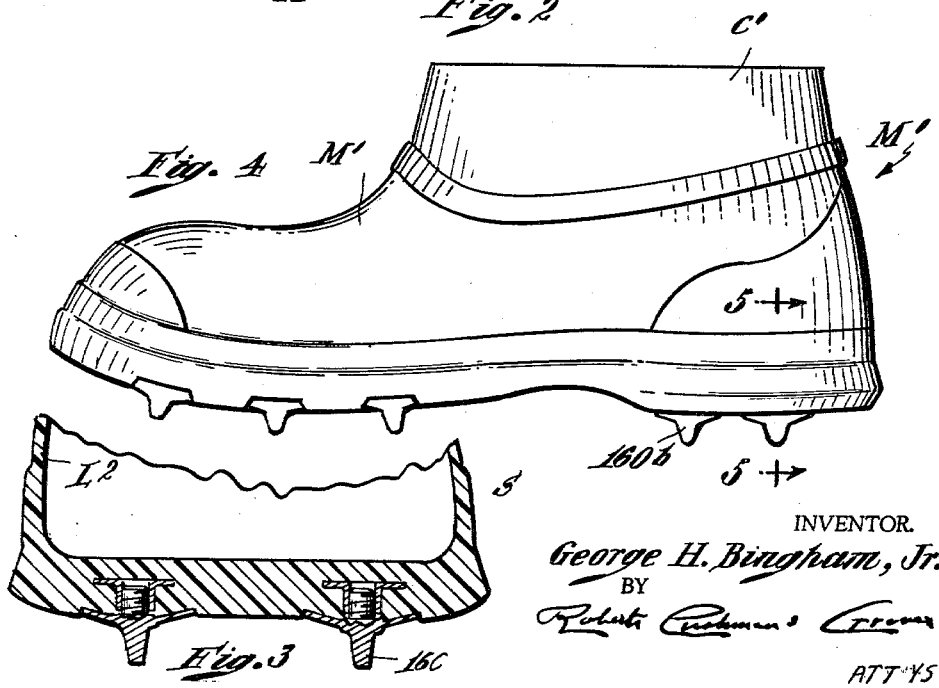
INVENTOR.
George H. Bingham, Jr.
BY
Roberts Cushman & Grover
ATT'YS June 1, 1965 G. H. BINGHAM, JR 3,187,073

METHOD OF MAKING A SPIKED, WATERPROOF SHOE

Filed April 26, 1962 2 Sheets-Sheet 2

United States Patent Office 3,187,073
Patented June 1, 1965

3,187,073
METHOD OF MAKING A SPIKED,
WATERPROOF SHOE
George H. Bingham, Jr., Westminster, Md., assignor to Cambridge Rubber Company, Taneytown, Md., a corporation of Maryland
Filed Apr. 26, 1962, Ser. No. 190,398
2 Claims. (Cl. 264—255)

This invention pertains to a method of making waterproof footwear, for example, but without limitation, a "mud-rubber" designed to be worn in situations where the ground is soft, slippery or sloping, and where firm footing is required. However, a "mud-rubber" is mentioned merely as an example of waterproof footwear of the type wherein spikes, or the equivalent, project downwardly from the bottom structure of the shoe or boot, including shoes designed for athletic use, golf, or similar purposes, and which are customarily made of leather or the like, but which, in accordance with the present invention, are of plastic or a combination of plastic with other materials.

One object of the invention is to provide a method of making a waterproof shoe, of the class above referred to, wherein the outer sole is of molded synthetic plastic instead of the leather or similar material customarily employed in such shoes, and wherein the spikes which project downwardly from the bottom of the outer sole are so anchored that they do not lean or twist during the use of the shoe. A further object is to provide a method of making a waterproof shoe, of the above class, whose outer wall, including the bottom structure, is flexible, and which has spikes, projecting downwardly from its tread surface, which are securely anchored to the material of the outer sole by means which does not substantially decrease the flexibility of the latter. A further object is to provide a method of making a spike shoe of the above type which is durable, comfortable, of pleasing design and which may be sold at a price substantially less than that demanded for customary shoes of this kind. A further object is to provide a novel method of making a waterproof spike shoe which is much less expensive than the customary prior methods of manufacturing spike shoes, for example of leather or rubber. A further object is to provide a novel method whereby a waterproof shoe having spikes projecting downwardly from its bottom surface may be made from synthetic plastic by the slush-molding method.

Other and further objects and advantages of the invention will be pointed out in the following more detailed description and by reference to the accompanying drawings wherein:

FIG. 1 is a side elevation illustrating an overshoe or "mud-rubber" embodying the present invention;

FIG. 2 is a bottom view of the shoe of FIG. 1;

FIG. 3 is a transverse section through the heel end of the shoe on the line 3—3 of FIG. 1 and diametrically through two spikes projecting downwardly from the bottom of the heel;

FIG. 4 is a diagrammatic side elevation of a mold made by electroplating a shoe such as that of FIG. 1, but after having provided the shoe with an upper extension so that the mold will be useful in the practice of the slush-molding operation;

Figure 12:
Figure 13:

FIGS. 12 and 13 respectively, are a plan view and elevation showing a spike assembly anchoring member of a modified form.

Referring to the drawings and, in particular, to FIGS. 1 and 2, the character S designates a "mud-rubber," such as may be made in accordance with the present invention, having the upper 10, the outer sole 11 including the heel 11a; an ornamental bead 12 at its top; a foxing strip 13 immediately above the outer sole; a toe reinforce element 14; and a heel reinforce element or counter 15. As illustrated, this shoe has spikes 16 projecting downwardly from the undersurface of the outer sole at its forepart portion and similar spikes 16a projecting downwardly from the undersurface of its heel portion. As shown in FIG. 2, the undersurface of the outer sole is provided with ribs R with intervening grooves arranged according to an ornamental design at its forepart and similar ribs $R^1$ at the undersurface of its heel portion.

Customarily, in making a waterproof shoe such as that shown in FIGS. 1 and 2, it has been built up piece-by-piece following the customary procedure in manufacturing rubber footwear and there have been embedded in the bottom structure rigid plates of sheet steel at the forepart and heel respectively, to which the downwardly projecting spikes are secured, thereby providing anchorage for the spikes but, at the same time, imparting an undesirable stiffness and rigidity to the bottom structure.

According to a preferred embodiment of the present invention and assuming that one desires to make a shoe of the same style, size and pattern as that of the shoe of FIG. 1 for example, and that a shoe like that of FIG. 1, made by prior procedures, for example from rubber, is available, a first step, in accordance with the present invention, would be to obtain such a shoe from any available source and then to secure within the top opening of the shoe an upstanding collar C (FIG. 1) of stiff material, for example of thin sheet plastic, such as Celluloid, whose lower margin might be secured to the inside surface of the upper of the shoe S by suitable adhesive or the like. This collar would project upwardly from the upper margin of the shoe as suggested in broken lines at C (FIG. 1), the provision of this collar, resulting in the formation of a mold, as about to be described, useful in the slush-molding process to be carried out as a later step.

Having provided the shoe S with this upstanding collar C, the shoe is then immersed in an electroplating bath and electroplated to form a thin metallic shell covering the entire exterior surface of the shoe S, including the bottom and the downwardly projecting spikes, and the upstanding collar C. Prior to this electroplating operation the downwardly projecting spikes 16 and 16a and the exposed portions of their anchorages should be coated with some material, for example wax, such as to prevent the metal, deposited during the electroplating, from adhering to the metal of the spikes.

Having prepared this electrodeposited shell, the shoe S, which has been used in carrying out the electroplating process, is removed from the shell. Usually this will necessitate the complete destruction of the shoe S in order that it may be removed piecemeal from the metallic shell or mold.

If desired, before the electroplating operation, the exterior of the shoe S may be modified as by the addition or removal of parts, so that the plastic shoes, to be made by the use of the mold may differ in desired particulars from the original shoe S.

Figure 5:
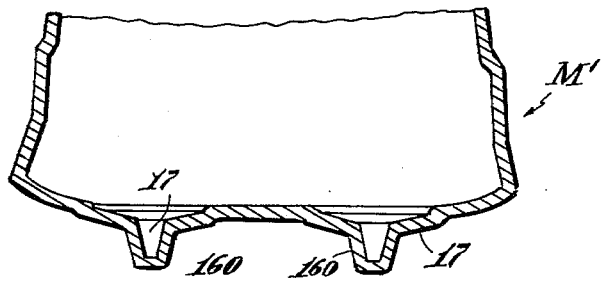
FIG. 5 is a fragmentary transverse section on the line 5—5 of FIG. 4, but to larger scale, showing the mold resultant from the electroplating process after the shoe has been removed therefrom.

The resultant shell or mold will have the general appearance, indicated at $M^1$ (FIG. 4), although the exterior of this mold, unless the electroplating operation be carried out with great care, may not have the exact appearance of the original shoe S. However, the interior of the mold $M^1$ will be an exact replica, but in reverse, of the exterior of the shoe S or as said shoe was modified before electroplating. A fragmentary vertical section of the mold $M^1$, in the plane of the line 5—5 of FIG. 4 and to larger scale is indicated in FIG. 5. As shown in FIG. 5, the bottom of this mold $M^1$ will have downwardly directed projections 160 at the location of the spikes 16 of FIG. 1 and, as shown in FIG. 5, these downward projections are hollow, having the cavities 17 corresponding in shape to the spikes 16 of the shoe S and which as here shown are of truncated conical shape.

Figure 6:
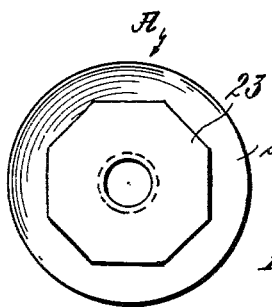
FIG. 6 is a top view of a spike assembly of a type such as may be employed in the practice of the present invention.
Figure 7:
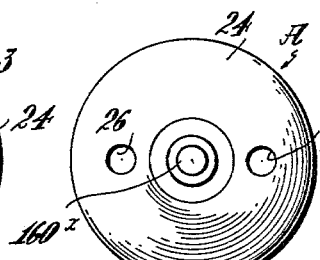
FIG. 7 is a bottom view of the same spike assembly.
Figure 8:
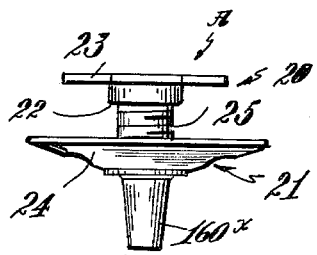
FIG. 8 is a side elevation of the spike assembly.

In preparation for the slush-molding operation, spike assemblies A, such as illustrated in FIGS. 6, 7 and 8, are procured, such devices being available and sold under the trade name "Champ." These spike assemblies are used in leather bottomed shoes, as above suggested, where there is built into the shoe bottom a stiff anchorage plate to which the several spike assemblies are secured. This results in a very stiff and rigid shoe bottom.

Each of these spike assemblies A comprise an upper anchoring member 20 and a lower spike member 21, the anchoring member, as illustrated, comprising an internally screw-threaded downwardly directed boss 22 provided with a substantially flat flange 23 at its upper end, while the spike member 21 has the downwardly directed truncated, conical spike $160x$ fixed, at its upper end, to a shallow, downwardly tapering anti-rock or abutment member 24, from the center of which a screw-threaded shank 25 extends upwardly and normally engages the screw threads in the hollow boss 22 of the part 20. Customarily, the member 24 is provided with openings 26 (FIG. 7) at diametrically opposite points for the reception of a spanner wrench, by means of which the part 24 may be rotated relatively to the part 22.

Having provided such spike assemblies A and having provided the mold $M^1$, as above described, the spike element $160x$ of each spike assembly is set down into a corresponding one of the cavities 17 in the bottom of the mold.

In accordance with one procedure the mold may now be filled with plastic of the selected type and which, when placed in the mold, is desirably of a creamy consistency. By heating the mold a layer of plastic of the desired thickness is caused to gel in contact with the inner surface of the mold. When this layer of appropriate thickness has gelled, the surplus material is poured out, it being noted that because of the collar $C^1$ (FIG. 4) constituting a part of the mold $M^1$, it is possible to fill the mold to a height such as to insure the making of a shoe having a full height upper.

Figure 9:
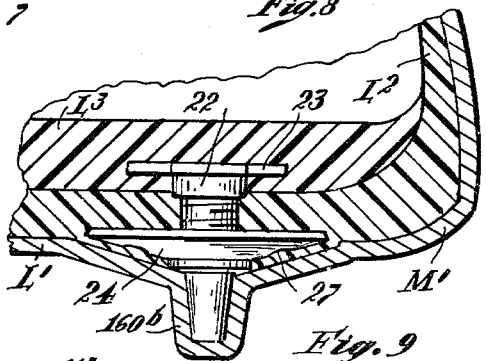
FIG. 9 is a fragmentary section in the same plane, for example, as that of FIG. 5, showing one of the spike assemblies as having been put in place in the bottom of the mold and as having its head portion embedded in a layer of plastic.

Usually, and since the mold is heated before the plastic is introduced, the layer $L^1$ at the bottom of the shoe will be thicker than the layer $L^2$ (FIG. 9) which forms the upper. However, the bottom layer $L^1$ would not ordinarily be of sufficient thickness completely to embed the upper member 20 of the spike assembly, and in order to provide a suitable thickness so as completely to embed this upper member, the mold would again be supplied with liquid plastic sufficient to cover the layer $L^1$ at the bottom of the mold and to embed the upper member of the spike assembly, such a layer being indicated at L in FIGS. 9 and 10. While this second layer may be of the same plastic as that employed in making the first layer $L^1$, it is preferred to use for this upper layer $L^3$ a plastic of somewhat harder character such as to give a good and firm support for the wearer's foot, while, at the same time, providing secure anchorage for the flange 23 of the spike assembly. Such a harder plastic may be for example, prepared by mingling with one hundred parts, by weight, of solid resin, in powder form, twenty-four parts of conventioned plasticizer and ten parts of a polymerizable plasticizer. As shown the upper member of the assembly is above the mid-thickness of the sole, thus providing a good leverage to resist tipping of the spike.

Figure 10:
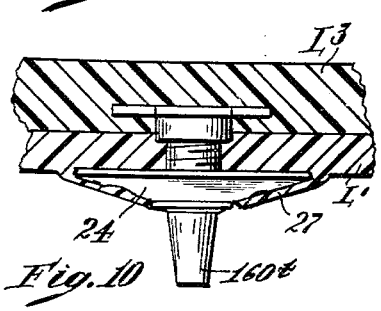
FIG. 10 is a transverse section, to larger scale than FIG. 3, showing a spike assembly such as that of FIGS. 6, 7 and 8, with its upper member embedded in the bottom substance of the shoe, as the shoe appears when withdrawn from the mold.
Figure 11:
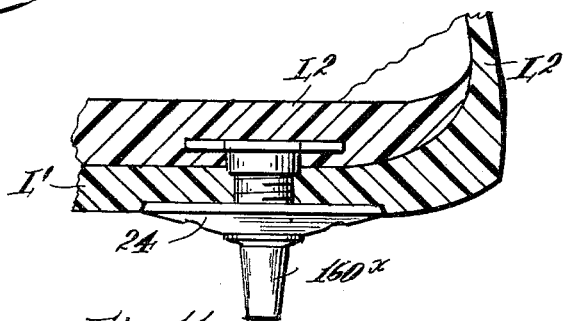
FIG. 11 is a section similar to FIG. 10, but showing the shoe with its embedded spike assembly after having had exuded plastic removed from the spike.

Since the spike element $160x$ of the spike assembly is merely set down into the cavity 17 of the mold preparatory to the molding operation, some of the plastic may flow downwardly below the anti-rock element 24 of this spike assembly, as shown at 27 (FIG. 9), and thus, when the molded shoe is withdrawn from the mold, the undersurface of the part 24 of the spike assembly may be partially covered with cured plastic as shown at 27 in FIG. 10. However, this plastic may readily be removed from the part 24 by the use of a trimming knife or even merely by pulling it away from the metal of the part 24, thus leaving the spike $160x$ and the part 24 of the spike assembly fully exposed as shown in FIG. 11. As may be noted from inspection of FIG. 8 for example, the anchorage flange 23 is of a diameter exceeding that of the spike $160x$, for example in a ratio of approximately 3:1, while the diameter of the base or abutment member 24, is even greater, for example, in the ratio of 4:1.

With the flange 23 of the spike assembly embedded in the plastic of the bottom structure and particularly when the layer $L^3$ of plastic is a harder type than that which forms the shoe upper and with the large area of the part 24 in contact with the lower surface of the sole, the spike assembly is so firmly held in place that the spike $160x$ cannot twist or lean during the use of the shoe, although the shoe bottom, as a whole, is much more flexible than one in which the spikes are all anchored to a metal plate or the like, embedded in the shoe bottom and extending over a substantial area of the latter.

In FIGS. 12 and 13, there is illustrated an upper member $20a$ for a spike assembly which differs from that above described in that its flange $23a$ has downwardly directed prongs $23b$ at its edge, providing additional resistance to rotation of said anchoring member relatively to the body of plastic in which it is embedded.

The method above outlined makes it possible to make a waterproof spike shoe having the desired characteristics of a shoe of the same general type but made by customary rubber procedures at a much less cost than that incurred in the manufacture of shoes by the rubber procedure and, at the same time, provides a shoe which is more flexible and more comfortable. This method, as outlined, also makes it possible for the would-be manufacturer of such plastic shoes to make a shoe of the size and style of a shoe which may already be on the market, without going to the expense of preparing a last and the corresponding patterns which he would be obliged to do if he were to proceed in accordance with customary rubber shoe practice, thus further decreasing the cost of production.

While the entire shoe may be made of plastic in accordance with the slush-molding procedure, as above described, it is contemplated as within the broad purview of the invention to make a spike soled shoe having spikes anchorage embedded, as above described, in an outersole consisting, in major portion at least, of molded plastic, but wherein the upper may be of any desired material, as for instance textile fabric. Thus, for example, the lasted upper may be fitted into a mold designed for injection molding (but having spike-receiving sockets such as the sockets or cavities 17 above described), and having spike assemblies seated in said sockets of the mold, and then injecting fluid plastic into the mold so as to fill voids in the mold while embedding the anchorage members of the spike assemblies, the injected material, when cured, constituting the outer sole. As a further possibility, the mold employed may be of the kind used when bonding a lasted shoe upper to a previously formed blank of partially cured, but moldable plastic (the mold also, in this instance, having sockets or cavities like the sockets or cavities 17 above described). Having provided such a mold and having placed spike assemblies in the sockets or cavities of the mold, a moldable blank of plastic, incompletely cured, appropriate to form the outer sole, is then laid upon these spike assemblies within the mold and the lasted shoe upper is placed upon the blank and then, while applying heat and pressure, the blank is conformed to the mold cavity while embedding the anchorage elements of the spike assemblies so that when the blank has been fully cured it constitutes an outer sole permanently bonded to the lasted shoe upper and having the anchorage elements of the spike assemblies permanently embedded therein.

While certain specific types of spike assembly have herein been suggested as useful, it is to be understood that the invention is not dependent upon the particular types shown and that the same general procedure may be employed in making spike shoes in which other types of spikes are employed as well as for making shoes in which cleats or similar ground-gripping elements project downwardly from the bottom of the shoe.

It will be understood that while a certain specific sequence of method steps has herein been suggested and while certain materials have been named as useful and while a particular style of shoe has been employed for illustrative purposes, the invention is broadly inclusive of any and all equivalents of the process steps or materials referred to in the appended claims.

I claim:

1. That method of making a waterproof shoe having spikes projecting downwardly from its bottom which comprises as steps: preparing a mold whose inner surface is a replica, but in reverse, of the exterior of the shoe to be made, the bottom of the mold having cavities of a shape corresponding to the shape of the desired spikes, providing spike assemblies, each comprising a spike element and an abutment element, and an anchorage element spaced from the abutment element, disposing the spike element of each assembly in one of the cavities in the bottom of the mold, filling the mold with fluid plastic and causing said plastic to gel in contact with the inner surface of the mold wall thereby to provide a layer of desired thickness, pouring out surplus plastic, introducing more fluid plastic to form a second layer in the bottom portion only of the mold and causing sufficient of said latter plastic to gel to embed the anchorage element of the spike assembly, pouring out surplus plastic, completely curing the plastic within the mold and withdrawing the thus formed shoe from the mold thereby providing a spike shoe the outer ply of whose upper and the bottom ply, at least, of the sole being of plastic.

2. That method of making a waterproof shoe having spikes projecting downwardly from the undersurface of its outer sole which comprises as steps: providing a mold whose inner surface is a replica, but in reverse, of the outer surface of the desired shoe and having pockets in its bottom, each of a size and shape to receive a spike of the desired type, the pockets being distributed according to the desired location of the spikes in the shoe to be made, providing spike assemblies, each including a spike, an anti-rock abutment element and an anchoring element, the anti-rock element being fixed to the upper end of the spike and the anchoring element being spaced above the upper end of the spike but connected to the latter, the anchoring element being of a diameter substantially exceeding that of the spike and the anti-rock element exceeding in diameter the anchoring element, disposing the spike of each anchoring element in one, respectively, of the pockets of the mold, filling the mold with fluid plastic of a type appropriate, when cured, to form the upper of the shoe and, by the application of heat, causing a layer of said plastic to gel in contact with the interior of the mold thereby to form the outer ply of the upper and the lowermost ply of the outer sole and which covers and contacts the upper surface of the anti-rock element of the spike assembly, pouring out surplus plastic from the mold, then flowing over the gelled layer, forming the bottom ply of the outer sole, fluid plastic which, when cured, is harder than that which forms the upper and so as to form a layer embedding the anchorage element of the spike assembly, then, after said latter plastic has formed a gelled layer of the desired thickness, pouring out surplus material, completely curing the plastic within the mold, withdrawing the thus molded shoe, and removing from the exposed surface of the anti-rock element any plastic adherent thereto.

References Cited by the Examiner

UNITED STATES PATENTS

| 2,290,792 | 7/42 | Abbott. | |
|---|---|---|---|
| 2,763,031 | 9/56 | Rekettye | 264—311 |
| 2,785,481 | 3/57 | Joseph | 36—107 |
| 2,918,733 | 12/59 | Anderson | 36—107 |
| 2,939,180 | 6/60 | Hickler et al. | |
| 3,035,309 | 5/62 | Bingham. | |

FOREIGN PATENTS

| 617,724 | 4/61 | Canada. |
|---|---|---|
| 1,125,928 | 7/56 | France. |

ROBERT F. WHITE, *Primary Examiner.*

EDWARD V. BENHAM, ALEXANDER H. BRODMERKEL, *Examiners.*